US006782593B1

(12) United States Patent
Shimony

(10) Patent No.: US 6,782,593 B1
(45) Date of Patent: Aug. 31, 2004

(54) KITCHEN SINK

(75) Inventor: Eli Shimony, Herzliya (IL)

(73) Assignee: Merhav-Designer Building Products Ltd., Ashdod (IL)

(*) Notice: Subject to any disclaimer, the term of this patent is extended or adjusted under 35 U.S.C. 154(b) by 0 days.

(21) Appl. No.: 10/369,129

(22) Filed: Feb. 20, 2003

(30) Foreign Application Priority Data

Feb. 18, 2003 (IL) ........................................ 154526

(51) Int. Cl.[7] ........................................ B23P 23/00

(52) U.S. Cl. ........................ 29/401.1; 4/630; 4/632; 4/636

(58) Field of Search ........................ 29/401.1, 402.01, 29/402.04, 402.05, 402.06, 402.19, 458, 557, 28; 312/228; 4/660, 584, 570, 630–636

(56) References Cited

U.S. PATENT DOCUMENTS 3,585,657 A * 6/1971 Jensen ........................ 4/633
5,860,172 A * 1/1999 Pfeiffer ........................ 4/631
6,108,831 A * 8/2000 Lombreglia, Jr. ............ 4/631
6,311,345 B1 * 11/2001 Limbach ...................... 4/632

* cited by examiner

*Primary Examiner*—I Cuda Rosenbaum
*Assistant Examiner*—Stephen Kenny
(74) *Attorney, Agent, or Firm*—Dennison, Schultz, Dougherty & MacDonald

(57) ABSTRACT

A method of making a flush mountable ceramic sink characterized by having a mouth opening into a planar flange surrounded by an outer rim, the method comprising the steps of: (a) producing a green sink having a base with a mouth surrounded by a lip opposite the base, the lip being surrounded by an outer rim; (b) drying the green sink; (d) firing the green sink; (e) allowing to cool; (g) grinding the lip of the sink flat to form a ground planar flange; (h) grinding away the outer rim at an angle to the planar flange, so that the outer rim tapers from the flange inwards towards the bottom of the sink; (i) applying a post grinding glaze at least to the flange, and (j) firing the post-grinding glaze.

20 Claims, 6 Drawing Sheets

KITCHEN SINK

FIELD OF THE INVENTION

The present invention relates to sinks, particularly to kitchen sinks that are set into work surfaces, and the like.

BACKGROUND OF THE INVENTION

For ease of use, kitchen sinks are usually positioned below the height of work surfaces, so that the mouth of the sink is at the height of the work surface. A variety of materials have been used for the manufacture of sinks and of work-surfaces, with the preferred material combinations in different countries being usually a trade-off between performance and cost, with tradition and the availability of various raw materials affecting preferences.

One preferred material for the fabrication of work surfaces is natural stone, preferably granite or other hard stone, that may be ground down and polished to a smooth and attractive finish, and that is scratch-resistant and resistant to chemical attack from household cleaners, lemon juice and other fluids with which it may come in contact. Where natural stone is expensive, artificial laminates such as formica, on chip-board countertops are also widely used. Although artificial materials provide a wider range of colours and textures than stone, they are generally less hard wearing, and their preference is usually for economic reasons.

The properties required for sinks are generally different from that required by the surrounding work surfaces. Sinks are manufactured from materials that are formable into deep containers, and are generally required to be waterproof to the extent, that when plugged, can hold water for long periods of time without warping, rusting or leaking. Sinks have been made from enameled cast iron, and this provides a relatively cheap, scratch resistant material. If the enamel chips however, the iron may rust. Stainless steel sinks are rust-resistant and fairly chemical resistant. They may scratch though. Additionally, unless the work surface is itself made completely from stainless steel, the sink tends to contrast with the work surface material, and looks unnatural when mounted in wood or stone work-surfaces, and in wood-like or stone like formica. Ceramic sinks have many advantages in that they may be produced in a range of colours and shades, when glazed are chemical resistant and scratch resistant, and can be cast into a variety of shapes and forms. Usually casting sinks from ceramics offers slightly more flexibility in the design shape than the deep drawing techniques used for fabricating sinks stainless steel.

In chemical workstations, for laboratories, fume cupboards and manufacturing plants the choice of material for work surfaces and for sinks is determined by the particular application both work surfaces and sinks are required to resist corrosion from the particular chemicals that they may come into contact with, particularly by the expected presence or absence of organic solvents and the like.

In laboratories, particularly within fume cupboards, the sink may be integrally fabricated with the surrounding countertop, either cast together therewith, or deep drawn therefrom. In domestic applications, the work surface is generally designed to fit a space, and invariably the work surface and the sink are separate units, that are often fabricated from different materials.

In general a sink may be attached to a work surface in one of three ways: (i) below, (ii) above, (iii) flush with the work surface.

(i) This is an established manner for attaching enamel sinks below both formica and stone work surfaces, and is sometimes used with stainless steel sinks. A hole is fabricated in the work surface, and the sink is attached below the hole. Where a particularly thick work surface is used, a stepped hole may be fabricated therein, such that the sink may be mounted below a thinner layer than the full work-surface. One disadvantage of under-surface mounting of this type, is that the join at the mouth of the sink, below the work surface, often accumulates dirt and mold. This may be difficult to clean, unsightly and unhygienic.

(ii) Above mounting is particularly applicable for mounting stainless steel sinks within counter tops and similar work surfaces. Around the mouth of the sink, there is a lip which protrudes above the work surface, and is usually attached thereto with a water resistant adhesive/sealant. Above mounting is inherently unsuitable for ceramic sinks, as they usually have too great a wall thickness. Another disadvantage of this type of mounting is that liquids on the work surface will not flow into the sink, and this makes washing down the work surfaces more difficult. Stainless steel sinks that are integrally connected to draining boards, where the sink and draining board unit is above mounted to the work surface provides a useful and widespread solution for formica on chipboard counter tops, where the counter top is best protected from large amounts of water, and the cleaning of the counter top is performed using a damp sponge. Here, the countertop can be fitted to the available space, and a sink and drainer can be selected from a small range of available, prefabricated off-the-shelf options.

(iii) Some stainless steel sinks, have a lip around the mouth of the sink, that widens into a flange. Although such sinks may be mounted above or below the counter top as described above, a preferred manner for mounting such stainless steel sinks to stone work surfaces, that is also applicable for some other materials combinations, is by flush-mounting. Here, the opening in the work surface is accurately cut, and finished with a sloping edge, and the sink is inset into the opening, so that the flange is substantially parallel to the work surface of the counter top. The sink being fixed in place, by a sealing adhesive such as silicone. A disadvantage of flush mounting in this manner is that it is inapplicable to ceramic sinks, since these invariably have uneven mouth openings/non planar flanges due to the casting and firing process used in their manufacture. It will be appreciated that a small unevenness in the height of the sink opening will be accented when such a sink is surface mounted. For this reason, the surface mounting of ceramic sinks is unknown, and despite the many advantages of ceramic sinks, such as low material and fabrication costs compared to quality stainless steel, wide range of colours available, and good scratch and chemical resistance, their use is largely confined to wash-basins, which are typically pedestal mounted, or bracket mounted to the wall of bathrooms, the sink not being mounted within a countertop or work surface.

Where used in kitchens, ceramic sinks are only ever mounted under the countertop, with all the disadvantages discussed hereinabove. Recently, integrated ceramic sink and work surface units have been fabricated for use in bathrooms. Here, the sink and work surface unit comes in a standard width, usually 105 cm or 120 cm, suitable for fixing over a bathroom cupboard. Since ceramic materials are inherently brittle however, the larger and more unwieldy the casting, the more difficult it is to transport and breakages are common. Integrated sink-countertop units are not generally suitable for kitchens, since much larger work surfaces are needed, than the washbasin surrounds of a bathroom cupboard, and as discussed above, kitchen work surfaces are usually designed to fit the space available, and are not restricted to limited range of sizes.

Thus despite the desirability of a ceramic sink fitted into a counter top, so that the mouth of the sink is flush with the work-surface, because of the abovementioned fabrication problem of the mouth warping during the kiln treatment necessary to harden the ceramic, such sinks are unknown. The present invention is directed to provide a method of fabrication for such a sink, a method for its installment, and sinks of this type.

SUMMARY OF THE INVENTION

It is a aim of the present invention to provide a According to the present invention, there is provided a method for fabricating a flush mounted ceramic sink.

It is a further aim of the present invention to provide a method for converting an existing ceramic sink into a flush mountable one.

It is another aim of the present invention to provide a ceramic sink that is flush-mountable within a countertop.

It is yet a further aim of the present invention to provide a method for flush mounting a ceramic sink into a countertop.

In accordance with a first aspect of the invention there is provided a method of converting a prior art ceramic sink having a mouth opening above its base; the mouth opening being surrounded by a non planar lip having an outer rim; into a flush mountable ceramic sink, comprising the steps of: grinding the non planar lip of the sink flat to form a planar flange; grinding away the outer rim of the flange at an angle to the planar flange, so that the outer rim of the flange tapers inwards from the flange towards the base of the sink; applying a post grinding glaze, at least to the flange; and firing the post-grinding glaze.

In accordance with a second aspect of the invention, there is provided a method of making a flush mountable ceramic sink characterized by having a mouth opening into a planar flange surrounded by an outer rim, the method comprising the steps of: producing a green sink having a base with a mouth surrounded by a lip opposite the base, the lip being surrounded by an outer rim; drying said green sink; firing the green sink; allowing the fired sink to cool; grinding the lip of the sink flat to form a ground planar flange; grinding away the outer rim at an angle to the planar flange, so that the outer rim tapers from the flange inwards towards the bottom of the sink; applying a post grinding glaze at least to the flange, and firing the post-grinding glaze.

Optionally, the method includes the additional step of applying a glaze to the green sink, prior to the firing step.

Optionally the lip of the green sink is a wide lip having holes therethrough.

Preferably, an additional step of quality control is performed, to reject poorly processed sinks, prior to the grinding stages.

Optionally, the method includes the further step of making holes in the sink. Typically such holes includes at least some of the following holes selected from the list of plug holes, overflow holes, hot-water pipe holes, cold-water pipe holes, mixer-tap holes, soap dispenser hole and drinking water pipe hole.

Preferably, the method also includes an additional step of quality control, to reject poorly processed sinks.

Preferably, the grinding away of the outer rim of the mouth is at an angle of 75° to 83° to the flange, so that the outer rim of the sink slopes inwards therefrom towards the base of the sink.

In accordance with a third aspect of the invention, there is provided a flush mountable ceramic sink, manufactured in accordance with one of the above methods.

In accordance with a fourth aspect of the invention, the ceramic sink may be flush mounted within a countertop having a planar work surface, such that the planar flange of the sink is parallel to the work surface of the countertop, and is essentially coplanar therewith, and the invention is also provides a method of mounting the flush mountable ceramic sink described hereinabove within a hole in a countertop having a planar work surface so that the planar flange of the sink is essentially coplanar with the work surface.

BRIEF DESCRIPTION OF THE DRAWINGS

The present invention will be further understood and appreciated from the following detailed description taken in conjunction with the drawings in which.

DETAILED DESCRIPTION OF THE INVENTION

Figure 1:
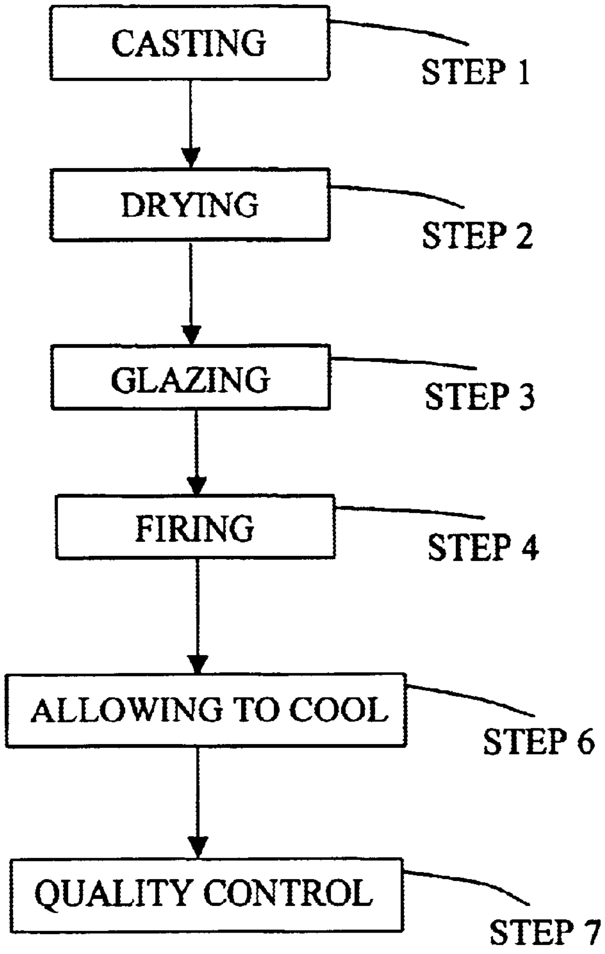
(PRIOR ART) FIG.1
FIG. 1 is a flow diagram showing the stages of fabrication of a ceramic sink of the prior art, having warped lips to the mouth, thereof, and being inherently unsuitable for flush-mounting.

With reference now to FIG. 1, there is shown a flow diagram showing the stages of fabrication of a ceramic sink of the prior art. The fabrication process includes the following stages:

(a) A 'green' sink is produced by casting from appropriate vitreous china, usually by slip casting (Step 1). If the mould is designed appropriately, various holes, such as the plug hole and over-flow hole are cast therein, or can be easily drilled therethrough, whilst the clay is still soft and damp. Optionally and preferably, holes for faucets, fresh-water taps and the nozzle of built in soap dispensers can be added most conveniently at this stage. (Although, such holes may be drilled through the sink after firing, but this is much more difficult and time-consuming, and further, carries increased risk of sinks becoming cracked or otherwise damaged).

(b) after casting, the free standing green sink is dried, by being exposed to warm air for an extensive period of time. Typically the drying stage is effected at a temperature of around 70° C., and the sink is left to dry for at least 48 hours (Step 2).

Figure 2:
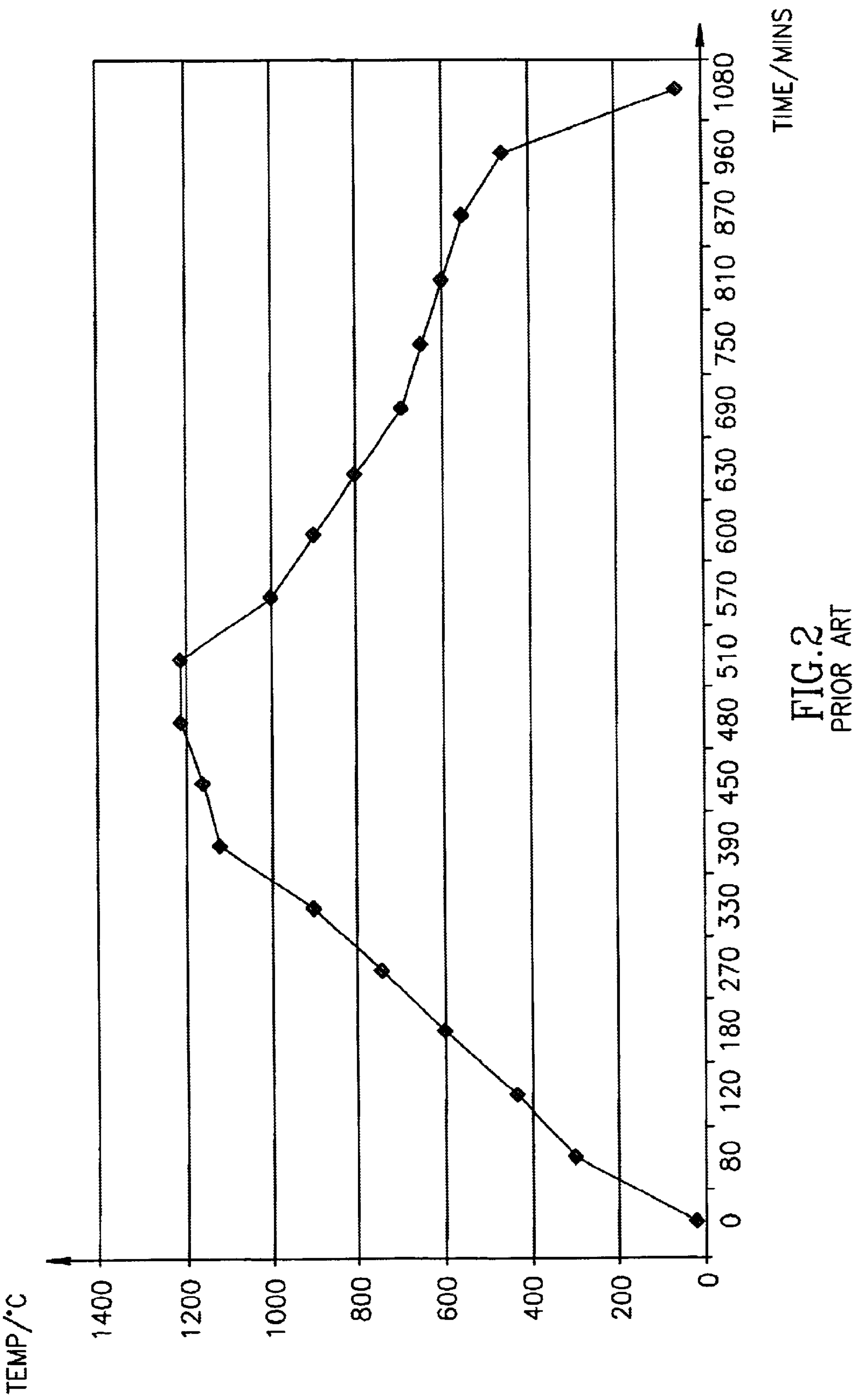
FIG.2 PRIOR ART
FIG. 2 shows a typical temperature-time plot appropriate for sintering the vitreous china sink.

(c) After drying, a glaze material is added to the green sink (Step 3), and then (d) the green sink is fired within a kiln or furnace, to dry out the moisture entirely, and to sinter the clay particles together to form a solid ceramic (Step 4). Usually the kiln is heated to a temperature of around 1200° C., and an example of a typical temperature-time plot of a heating and cooling cycle appropriate for firing a vitreous china sink, lasting a total of approximately 18 hours, is shown in FIG. 2.

(e) Then the sink is allowed to cool (Step 5).

(f) Following cooling, such prior art sinks are rigorously inspected for faults, that may include poor colour uniformity, poor colour shade, poor quality glaze, cracks or microcracks, and a certain percentage of sinks thus formed are generally rejected to ensure quality of the production (Step 6).

There is one widespread defect that is well-nigh impossible to avoid, particularly since such castings are relatively large and heavy; the lip of the sin thus formed, ie. the edge of the mouth or opening to the sink, is typically slightly warped. Generally however, this defect is of little consequence. No customer measures the sink for planarity, and this slight warping is generally of no consequence.

One disadvantage of ceramic sinks being slightly warped however, is that were the sink to be flush mounted within a countertop, the warping becomes much more noticeable, and the end result is most unattractive. In consequence, despite the many attractions of flush mounting of sinks, and of using ceramic sinks, rather than stainless steel sinks, prior to the novel method disclosed hereinbelow, flush mounted ceramic sinks were unknown due to the lack of an appropriate manufacturing route, capable of overcoming the above discussed disadvantages.

Figure 3:
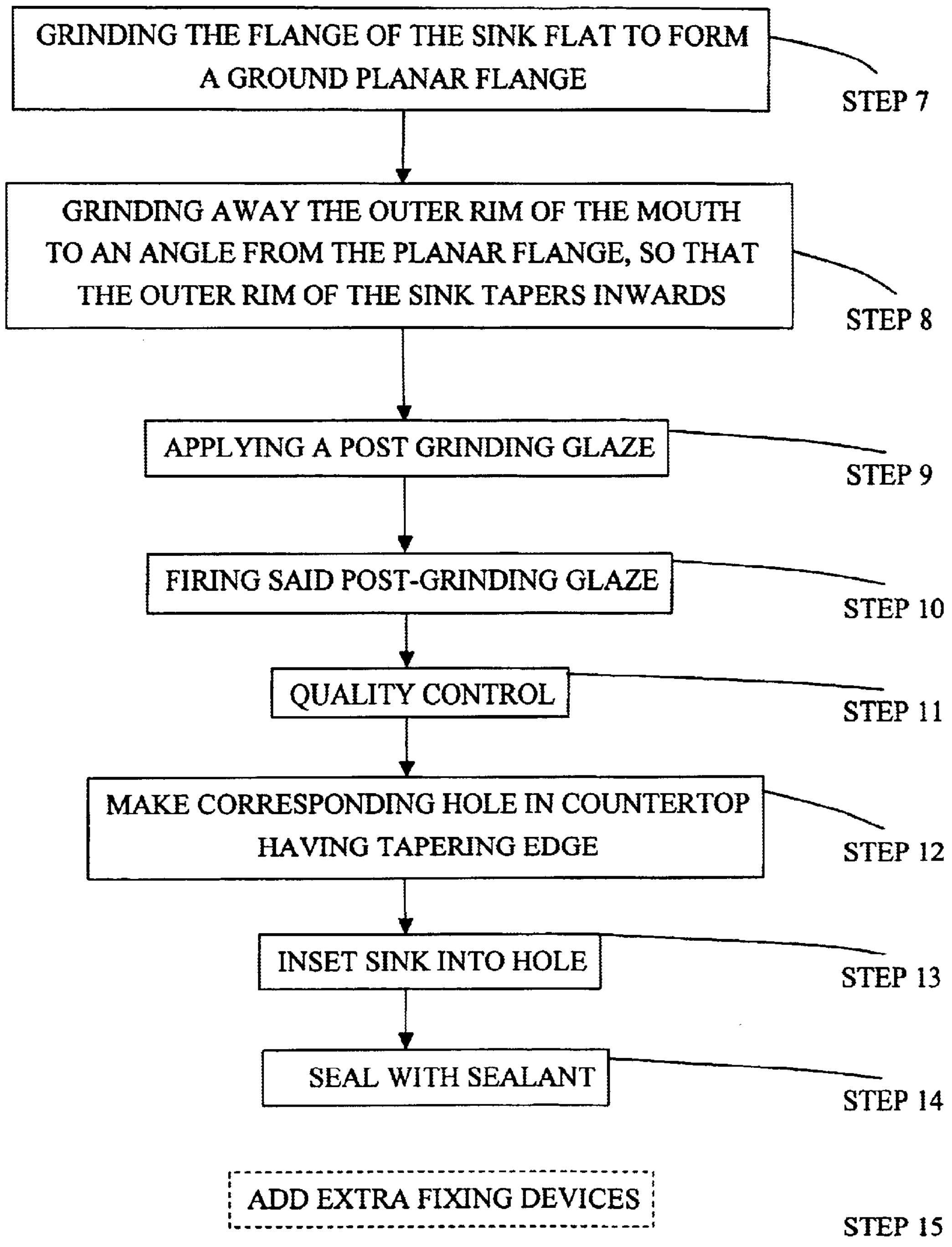
FIG. 3 is a flow diagram showing the additional steps required to convert the prior art ceramic sink of FIG. 1, into a ceramic sink that is suitable for flush mounting within a countertop, so that the mouth of the sink is essentially flush with the work surface.

Reference is know made to FIG. 3 which shows how a regular sink, such as the formed by the method described hereinabove, can be adapted for flush-mounting within a work-surface. The conversion process requires the additional steps of:

(g) Grinding the non planar lip or flange of the sink flat to form a planar flange (Step 7);

(h) grinding away the outer rim of the mouth to an angle from the planar flange, so that the outer rim of the sink tapers inwards, from the mouth downwards (Step 8); The grinding stage may be performed using a fluid-cooled diamond grinding tool, typically a water cooled, diamond in metal grinding wheel. Typically, the inner edge of the ground down mouth is itself ground r polished to blunten sharp edges.

Figure 4:
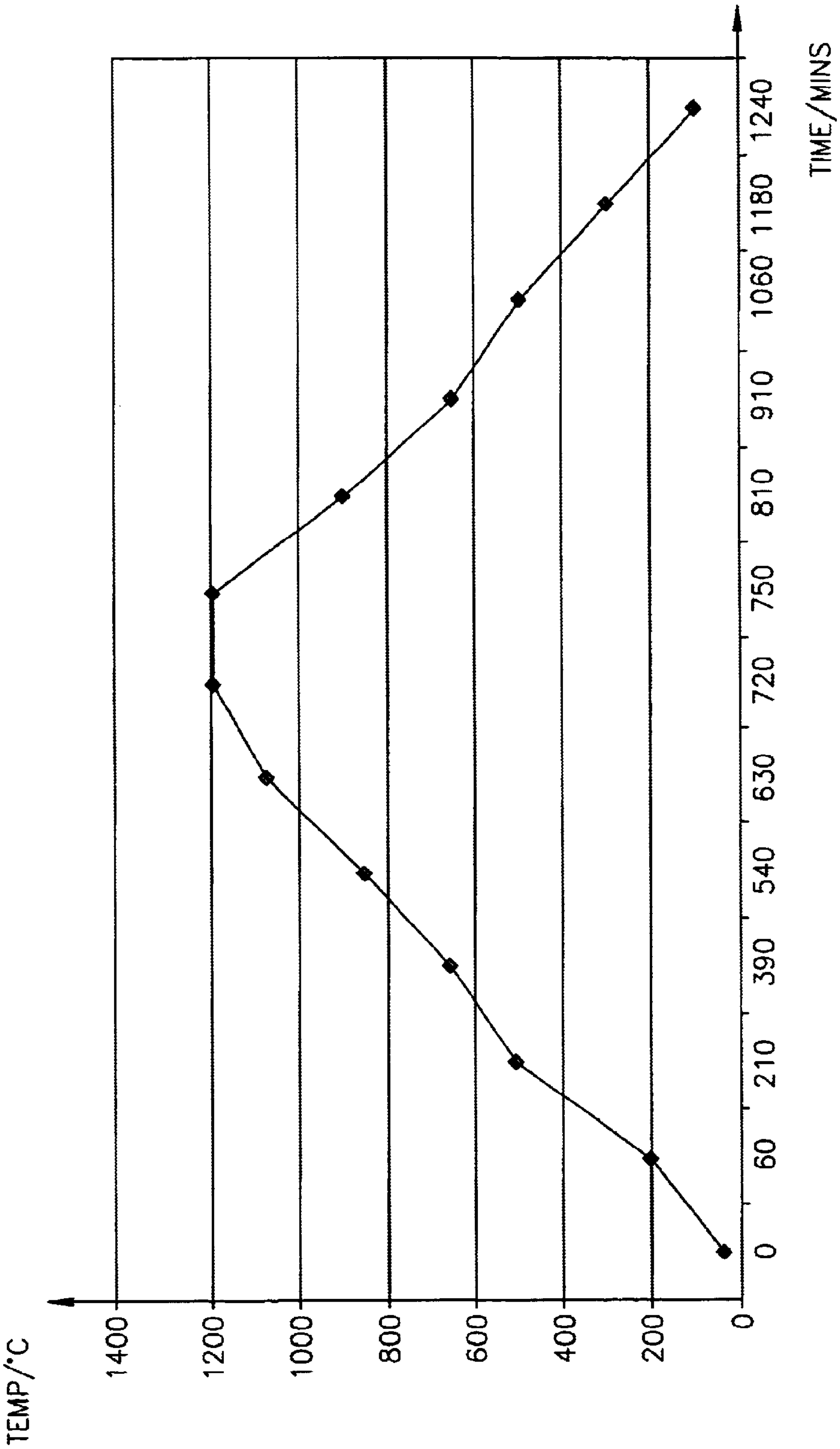
FIG. 4 shows a typical temperature-time plot appropriate for setting a post-forming glaze.

(i) applying a post grinding glaze (Step 9), and (j) firing said post-grinding glaze (Step 10). A typical temperature-time plot for this second firing cycle is shown in FIG. 4. The glaze must be applied at least to the ground down flange. The post grinding glaze may be identical in composition to the regular glaze.

Again, after the second firing process, (k) there are various quality control processes that are usually and usefully applied, such as visual inspection (Step 11).

It will be appreciated that the method of FIG. 3 can be used to convert a ceramic sink designed for mounting over the work-surface, or under the countertop into a flush mounted sink. Alternatively, sinks can be specially designed for flush mounting, and in this case, step 3, the first glazing stage, may be applied in specific areas of the sink only. No glaze need be applied in the area to be ground away. Furthermore, it is possible, but not generally advantageous to miss out the first glazing stage (Step 3) altogether, and to form a non-glazed sink, which may be completely glazed, by applying an all-over post grinding glaze (Step 10), after the first firing step (Step 4) and after the grinding steps (Steps 8 and 9).

Figure 5:
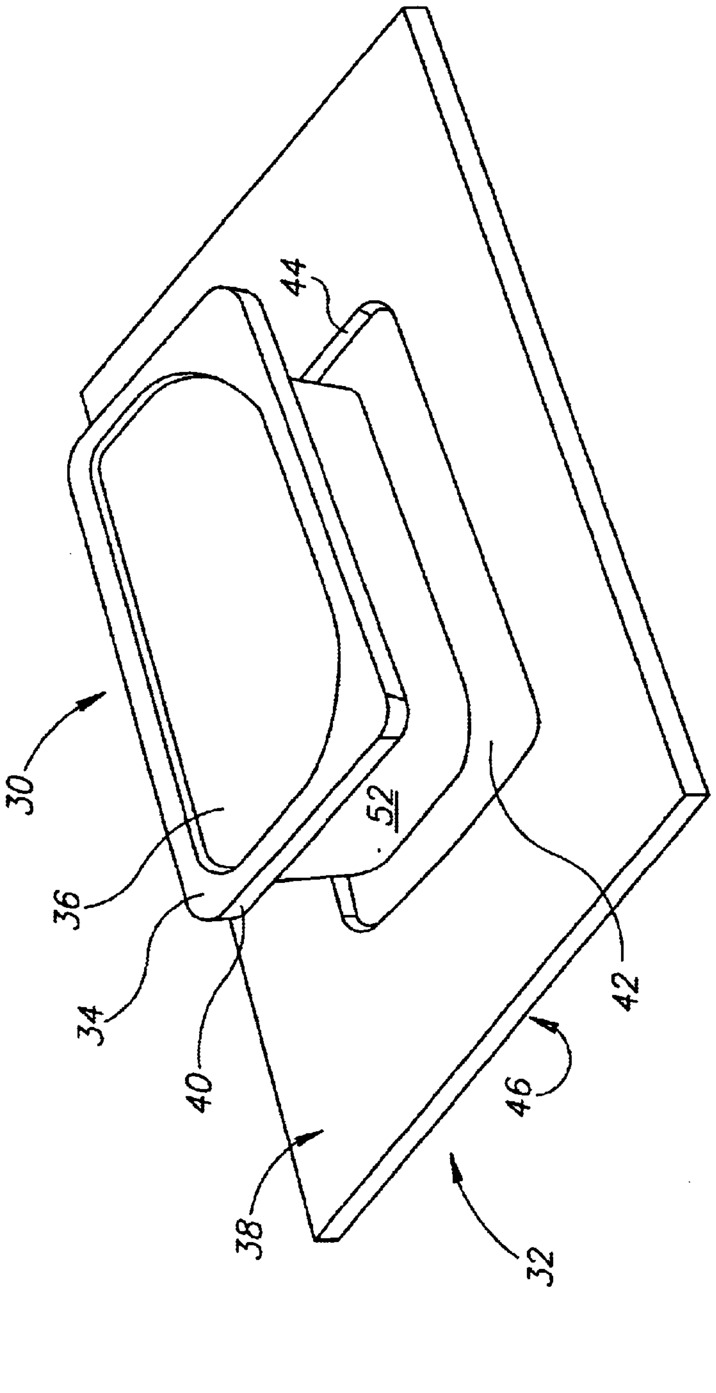
FIG. 5 is a schematic representation of a sink suitable for flush mounting.

With reference to FIG. 5, there is shown schematically, a ceramic sink 30 designed for flush mounting to a countertop 32, such that the flange 34 around the mouth 36 of the sink 30 is essentially co-planar, or only millimeters below the work surface 38 of the countertop 32. To achieve the flush mounting, the outer rim 40 of the flange 34 is ground smooth, at a slight angle sloping downwards and inwards from the plane of the flange, typically at an angle of approximately 70° to 84° thereto.

Figure 6:
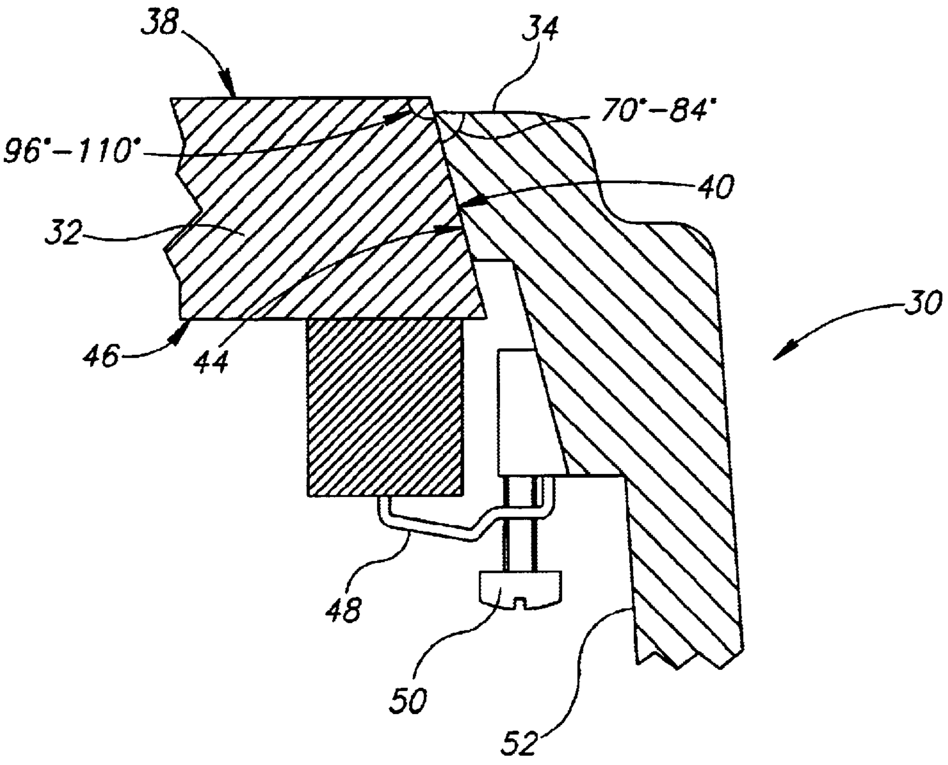
FIG. 6 shows in more detail, how the lip of the sink is attachable to the counter-surface.

Referring back to FIG. 3, with further reference to FIG. 5 and with reference to FIG. 6, where the joint between the flange 34 of the sink 30 and the countertop 32 is schematically illustrated. A hole 42 corresponding to the shape of the outer rim 40 of the flange 34, is cut into the countertop 32, such that the hole 42 has a sloping edge 44 through the countertop (Step 12), with the dimensions of the hole 42 at the level of the work surface 38 being slightly larger than the dimensions at the underside 46 of the countertop 32. The sloping edge 44 of the hole 42 should slope outwards at an angle of approximately 97° to 105°, so that when a sink 30 having a flange 34 is inserted thereinto (Step 14), the flange 34 fits flush within the hole 42, the sloping edge 44 supporting the sloping rim 40 of the flange 34. A flexible, waterproof sealant such as silicone rubber may be used to seal the sink to the work surface (Step 14), ensure a water-tight seal.

Additional fixtures may be used (step 15) to strengthen the join between the sink 30 and the countertop 42, such as clips 48, bolts 50 and the like, provided that such fixtures are fastened to the underside 46 of the countertop 42, and to the outer surface 52 of the sink 30, below the flange 34, and out of site.

It will be appreciated that the invention is not limited to what has been described hereinabove merely by way of example. Rather, the invention is limited solely by the claims which follow, in which the word "comprise", and variations thereof, such as comprising, comprised and the like, imply that he specified steps or components are included, but not necessarily, and indeed generally not to the exclusion of other non-specified steps or components.

I claim:

1. A method of converting a pre-formed ceramic sink into a flush mountable ceramic sink having a mouth opening above its base, said mouth opening being surrounded by a non planar lip having an outer rim, comprising the steps of:

(a) grinding the non planar lip of the sink flat to form a planar flange;

(b) grinding away the outer rim of the flange at an angle to the planar flange, so that the outer rim of the flange tapers inwards from the flange towards the base of the sink;

(c) applying a post grinding glaze, at least to the flange; and (d) firing said post-grinding glaze.

2. The method of claim 1 wherein said lip of said sink is a wide lip having holes therethrough.

3. The method of claim 1 including the further step of making holes in said sink.

4. The method of claim 3 wherein said holes are selected from the list of plug holes, overflow holes, hot-water pipe holes, cold-water pipe holes, mixer-tap holes, soap dispenser holes and drinking water pipe holes.

5. The method of claim 1 including an additional step (k) of quality control, to reject poorly processed sinks.

6. The method of claim 1 wherein said grinding away of the outer rim of the mouth is at an angle of 75° to 83° to the flange, so that the outer rim of the sink slopes inwards therefrom towards the base of the sink.

7. The method of claim 1 further comprising the step of mounting said flush mountable ceramic sink within a hole in a countertop having a planar work surface so that the planar flange of the sink is essentially coplanar with the work surface.

8. A method of making a flush mountable ceramic sink characterized by having a mouth opening into a planar flange surrounded by an outer rim, the method comprising the steps of:

(a) producing a green sink having a base with a mouth surrounded by a lip opposite said base, the lip being surrounded by an outer rim;

(b) drying said green sink;

(d) firing said green sink;

(e) allowing to cool;

(g) grinding the lip of the sink flat to form a ground planar flange;

(h) grinding away the outer rim at an angle to the planar flange, so that the outer rim tapers from the flange inwards towards the bottom of the sink;

(i) applying a post grinding glaze at least to the flange, and (j) firing said post-grinding glaze.

9. The method of making the flush mountable ceramic sink of claim 8, including additional step (c) of applying a glaze to said green sink, prior to said step of firing.

10. The method of making the flush mountable ceramic sink of claim 8, including additional step (f) of quality control, to reject poorly processed sinks, prior to said grinding stages.

11. The method of claim 8 wherein said lip of said green sink is a wide lip having holes therethrough.

12. The method of claim 8 including the further step of making holes in said sink.

13. The method of claim 8 including an additional step (k) of quality control, to reject poorly processed sinks.

14. The method of claim 8 wherein said grinding away of the outer rim of the mouth is at an angle of 75° to 83° to the flange, so that the outer rim of the sink slopes inwards therefrom towards the base of the sink.

15. The method of claim 8 further comprising the step of mounting said flush mountable ceramic sink within a hole in a countertop having a planar work surface so that the planar flange of the sink is essentially coplanar with the work surface.

16. A flush mountable ceramic sink comprising a mouth opening into a planar flange surrounded by an outer rim which tapers from the flange inwardly at an angle toward a bottom portion of the sink, and produced by a method comprising the steps of:

(a) producing a green sink having a base with a mouth surrounded by lip opposite said base, tho lip being surrounded by an outer rim;

(b) drying said green sink;

(d) firing said green sink;

(e) allowing to cool;

(g) grinding the lip of the sink flat to form a ground planar flange;

(h) grinding away the outer rim at an angle to the planar flange, so that the outer rim tapers from the flange inwards towards the bottom of the sink;

(i) applying a post grinding glaze at least to the flange, and (j) firing said post-grinding glaze.

17. The sink of claim 16, wherein the angle from the flange is about 70° to 84°.

18. The ceramic sink of claim 10 being flush mounted within a countertop having a planer work surface, such that the planar flange of the sink is parallel to the work surface of the countertop, and essentially coplanar therewith.

19. A flush mountable ceramic sink comprising a mouth opening into a planar flange surrounded by an outer rim which tapers from the flange inwardly at an angle toward a bottom portion of the sink, said sink being produced by a method comprising the steps of:

(a) grinding a non planar lip of a pre-formed sink flat to form a planar flange;

(b) grinding away an outer rim of the flange at an angle to the planar flange, so that the outer rim of the flange tapers inwards from the flange towards the base of the sink:

(c) applying a post grinding glaze, at least to the flange; and (d) firing said post-grinding glaze.

20. The sink of claim 19, wherein the angle from the flange is about 70° to 84°.

* * * * *